United States Patent [19]
Perrotti

[11] Patent Number: 5,269,392
[45] Date of Patent: Dec. 14, 1993

[54] RESTRAINT/SAFETY BELT ASSEMBLY (IGNITION KEY BELT)

[76] Inventor: Louis J. Perrotti, 2959 Carambola Cr., S., Coconut Creek, Fla. 33066

[21] Appl. No.: 779,952

[22] Filed: Oct. 21, 1991

[51] Int. Cl.$^5$ .............................................. B60D 1/28
[52] U.S. Cl. ..................................... 180/287; 70/429; 70/457; 180/271
[58] Field of Search ........................ 180/272, 287, 271; 70/457, 429, 431, 456 R; 24/3 K, 3 R, 601.6

[56] References Cited

U.S. PATENT DOCUMENTS

| | | | |
|---|---|---|---|
| 1,074,359 | 9/1913 | Heimbaugh | 70/429 |
| 1,100,647 | 6/1914 | Baumann | 24/601.6 |
| 2,248,338 | 7/1941 | Castleman | 70/457 |
| 2,466,688 | 4/1949 | Culver | 24/601.6 |
| 3,124,286 | 3/1964 | Dompier | 70/457 |
| 3,922,895 | 12/1975 | Greenebaum | 70/457 |
| 3,968,669 | 7/1976 | Coleman | 70/457 |
| 4,359,888 | 11/1982 | Scheineman | 70/457 |
| 4,502,226 | 3/1985 | Hung | 70/456 R |

FOREIGN PATENT DOCUMENTS 1558403  1/1969  France ........................ 24/601.6

*Primary Examiner*—Eric D. Culbreth

[57] ABSTRACT

A restraint/safety belt for operators of motor vehicles to be used in conjunction with the ignition key/keys of said motor vehicles. Said restraint/safety belt to be installed as a permanent part of the motor vehicle so as to prevent the operators from leaving their respective vehicles without removing their keys from the ignition switch.

3 Claims, 2 Drawing Sheets

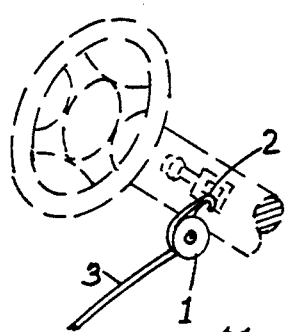
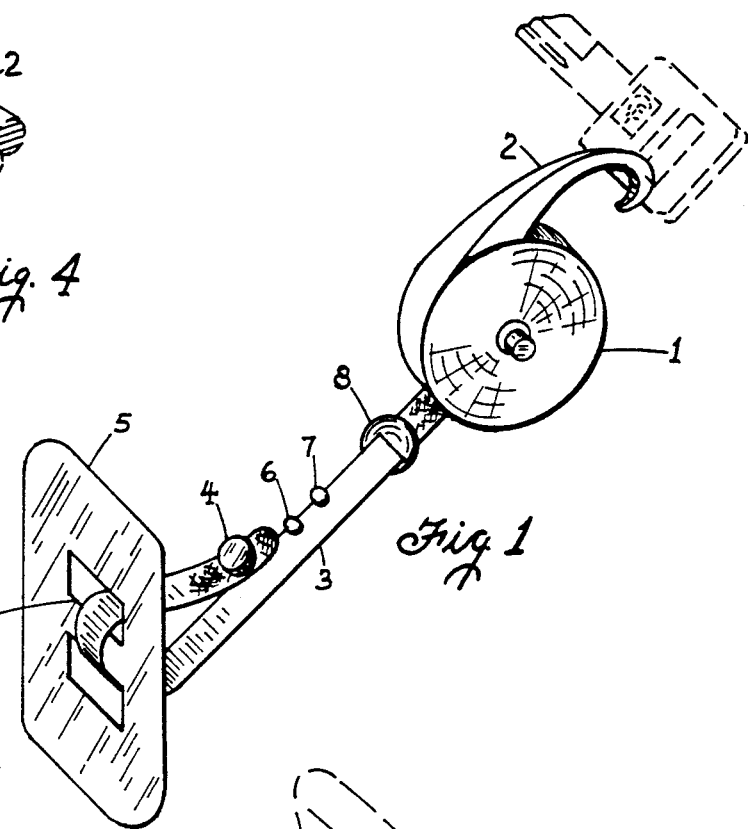
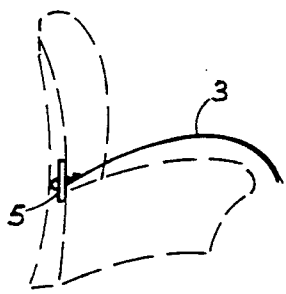
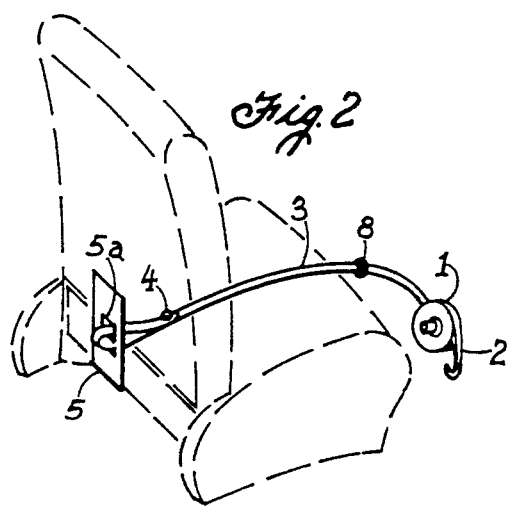
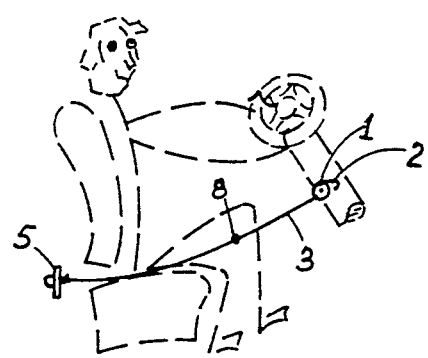

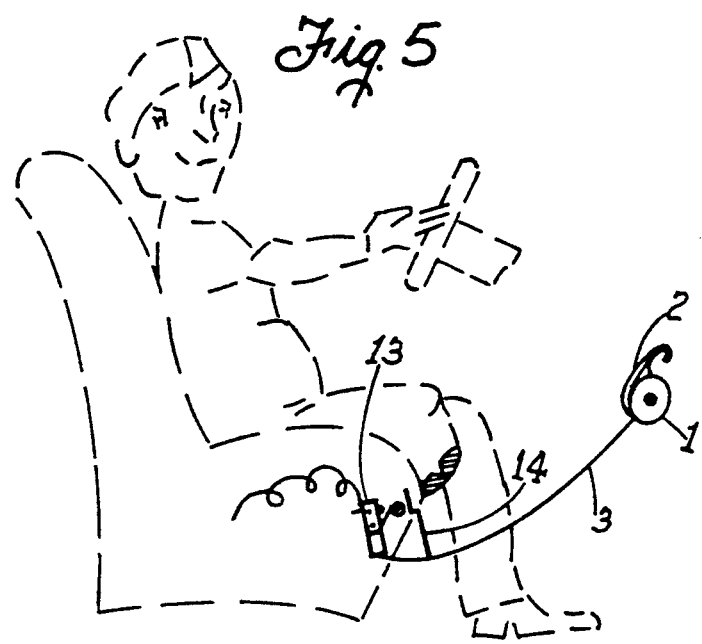
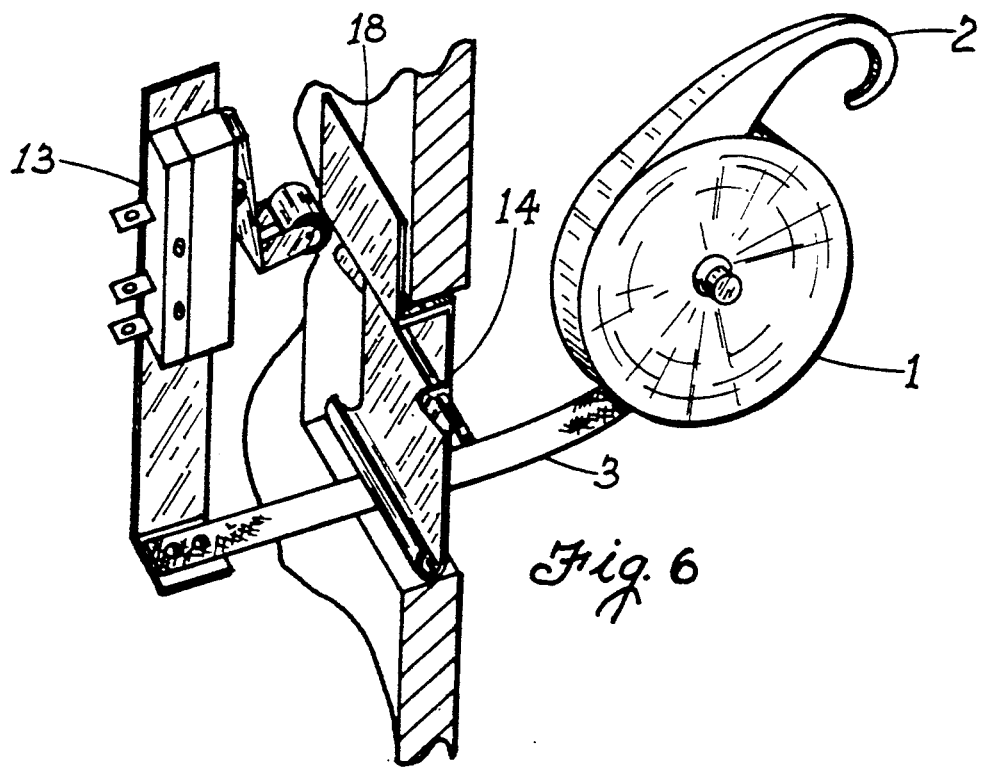

RESTRAINT/SAFETY BELT ASSEMBLY (IGNITION KEY BELT)

This invention is directed to safety belts and is particularly concerned with restraints for operators of motor vehicles, to be used in conjunction with the ignition keys in motor vehicles to ensure that they are safely removed from the vehicle when departing same.

The problem of providing operators of motor vehicles with a means and a reminder to remove their keys from the motor vehicle ignition switch and the motor vehicle itself is a long standing problem. The manufacturers of motor vehicles realizing this problem have incorporated many visual and audio systems in their vehicles in an attempt to call this matter to the attention of the operators. But none have here-to-fore employed the direct or positive restraint method in conjunction with the ignition key as described and disclosed in this invention. They have failed to provide a complete solution to the problem, consequently, leaving tremendous numbers of operators still locking or leaving their keys in their vehicles when departing same. This is causing them much grief and financial losses due to locksmith services and damage to the vehicle doors and windows in their own attempts to retrieve the keys. And they suffer higher losses as most often many vehicles are stolen when the keys are left or locked in the vehicle and left unattended.

This invention in no way presents an obstruction to the operator while the vehicle is in use, however, it does gently but effectively prevent or restrain the operator from leaving the vehicle while the restraint/safety belt is connected to the ignition key or key ring containing said key in the ignition switch. The use of this invention encourages and induces the operator to be ever mindful of the drastic consequences for leaving the keys in the vehicle, and provides a positive means for overcoming this problem.

It is accordingly a principal object of this invention to provide a new and more useful method that would effect a positive and physical connection between the operator of the motor vehicle and the ignition key in the ignition switch, thereby setting up a restraint that would necessitate the removal of same before the operator could freely leave the motor vehicle; subsequently calling attention to the operator to remove the keys from the ignition switch and the motor vehicle itself.

Another object is to prevent the operator from locking the ignition key/keys in his or her vehicle, thus saving them the grief of waiting for a locksmith to arrive to open the vehicle, and also saving them the financial burden for these services as well as for the repairs to the damaged doors or windows of the vehicle in their own attempts to open same.

Another object is to reduce the numerous amounts of vehicles that are being stolen each year as a result of the ignition keys being left in these unattended vehicles, so that the insurance companies might consider the reduction of the higher premiums being paid by all operators of motor vehicles due to these infractions. Further and more detailed objects of this invention will in part be pointed out and in part be apparent as the description of the invention taken in conjunction with the accompanying drawings procedes.

In the drawings:

FIG. 1 is a perspective view of a multi-directional, ratchet type, button release, retractable reel assembly incorporating an integral hook configuration and a flat restraint/safety belt specially designed retainer; all in accordance with the principal invention;

FIG. 2 is a perspective view showing the assembly of the component parts of the principal invention as covered in FIG. 1, installed in the operators' movable back, front seat section, and the location of the restraint/safety belt being between the operators' legs;

FIG. 2a is a side elevation in stick form, indicating the assembly of the invention as covered in FIG. 1, in a movable back, front seat section, and the location of the restraint/safety belt being between the operators' legs;

FIG. 3 is a side elevation showing the principal inventions' use and location of the special retainer for the restraint/safety belt behind and inside the operators' fixed back, front seat section;

FIG. 4 is a perspective view showing the hooking component parts as in FIG. 1, assembled to the ignition key in the ignition switch;

FIG. 5 is an animated side elevation showing the version of the invention as in FIG. 6, in conjunction with an electrical circuit and component parts assembled inside and beneath the operators' front seat section, FIG. 6 is a detailed view, in perspective, showing the invention assembly, on the outside of the operators' front seat section and installed in conjunction with an electrical circuit and parts, with the loose end of the restraint/safety belt attached inside and beneath the operators' seat section Considering first the principal embodiment of the invention, FIG. 1 shows the assembly of a ratchet type, button release, retractable reel unit 1 with an integral hook configuration 2, flat restraint/safety belt 3 with stop 8 and female snap button 4 along with male prongs 6 and 7, special restraint retainer 5 containing openings 5a.

Unit 1 with various designed integral hook configurations 2 can be made from ferrous and/or non-ferrous materials with button, cam release ratchet or free, spring loaded return. Said unit 1 would contain a flat restraint/safety belt 3 made from various materials and would contain a stop 8 thereon made from various materials and designed to create a tight, slide fit along the restraint/safety belt 3 for the desired stop locations for unit 1 assembly. The length of the restraint/safety belt 3 would be appropriately long enough to run from the back of the operators' front seat section, across the top of the seat cushion and over to the ignition key or key ring containing said key in the ignition switch of all makes and models of motor vehicles. The loose end of the restraint/safety belt 3 would contain a female snap button 4 and male prongs 6 and 7 for fastening purposes to the special restraint/safety belt retainer 5 which can be designed in various ways and made from various materials.

Unit 1 assembly with hook configuration 2 and component parts as described above are designed to be assembled to the operators' front seat section in motor vehicles by placing the special retainer 5 behind the operators' seat, passing the restraint/safety belt 3 through and between the movable, up-right back and lower seat sections and then lacing the restraint/safety belt 3 through the openings 5a in the special retainer 5 and then locking same, back on to itself by means of the female snap button 4 being snapped on to the male prong 6 or 7 whichever is most appropriate. This assembly is to be located to approximate being between the operators' legs, and with special retainer 5 being pulled up snug against the back of the operators' seat section, restraint/safety belt 3 lays on and across the top of the operators' seat cushion with stop 8 being positioned on the restraint/safety belt 3 to allow unit 1 assembly to hang freely over the front and slightly below the top of the operators' seat in a ready to use position as shown in FIG. 2 in the drawings.

Before starting the motor vehicle, and similar to buckling the seat belt in place, the operator places the hook configuration 2, of the retractable unit 1, into the opening of the ignition key or key ring containing said key in the ignition switch. This sets up the required restraint as intended by the invention. This will stay in place without any interference to the operator during the operation of the motor vehicle. But the restraint/safety belt 3 being between the operators' legs will obstruct/restrain and prevent the operator from leaving the vehicle when the vehicle is stopped, until he or she removes it from the ignition key or key ring containing said key in the ignition switch. This action calls direct attention to the keys and the need to safely remove them from the ignition switch and the motor vehicle itself.

The loose end of the restraint/safety belt 3 can accomodate various alternate holding, fastening devices.

In a fixed back, front seat arrangement as shown in FIG. 3, the restraint/safety belt 3 is laced and fastened to the special retainer 5 prior to any installation, and then, from the front, it is pressed back, into position between the sections of the up-right back and the lower seat cushion. Location is also to approximate being between the operators' legs and adjacent to his position to be adjusted for use in the same manner as described in FIG. 2 installation.

FIG. 5 illustrates the invention as described in FIG. 1, with the loose end of the belt installed inside and beneath the operators' seat section in conjunction with an electrical circuit that controls the operation of the ignition switch. 14 is a spring loaded flap arrangement in the front section of the operators' seat. This flap 14 remains closed when the restraint/safety belt 3, is in the retracted position, pulling the holding unit 1 up against the front panel. The spring flap 14 can be made from various materials to suit the decor of the vehicle. At this point, micro-switch 13 or any other control mechanism is then in a normal "open" sequence which kills the electric charge to the ignition switch, making it impossible to start the motor vehicle until the restraint/safety belt 3, with holding unit is utilized as designed and intended and as previously described.

When restraint/safety belt 3 is pulled forward, along with its component holding parts and attached to the ignition key or key ring containing said key in the ignition switch, the holding pressure against the spring loaded flap 14 is relieved, allowing the button end of the flap 14 to swing open. The opposite end of the flap 14 is formed to create a panel 18 which comes in contact with the micro-switch 13, or any other control mechanism, as it rotates in this direction in the opening process. It also acts against the inside portion of the operators' seat section 18a to serve as a stop for flap 14, to keep it in line with the front portion of the seat section.

When panel 18 makes contact with the micro-switch 13, as described above, this "closes" the circuit to the ignition switch, allowing the normal starting and operation of the motor vehicle. This assembly is to be installed in the appropriate location in the operators' seat section so that the restraint/safety belt 3, can be pulled up between the operators' legs, setting up the necessary restraint to serve the purpose of the invention.

FIG. 6 illustrates the electrical circuit arrangement and parts as described utilizing the principal invention as described in FIG. 1. The exception being that the loose end of the restraint/safety belt 3, is fastened directly to the inside and beneath the operators' seat section as shown, and is located to approximate being between the operators' legs. The operation of the ignition switch is controlled in the same manner with all parts moving and being utilized as described in FIG. 6. In each instance the purpose of the invention is served; setting up a restraint against the operator when the holding units and their component parts are connected to the ignition key or key ring containing said key in the ignition switch.

Each of the above embodiments as described and disclosed are utilitarian to carry out the objects of the invention with varying degrees of versatility, effectiveness and interest stimulation. The invention effectively encourages and induces through positive restraint, the pursuit of consciousness and rememberance on the part of the operators of motor vehicles to remove the ignition key/all keys from the ignition switch and the motor vehicle itself before departing same. This offers peace of mind to the operator and also assures the relative safe handling of the keys and the subsequent safety of the motor vehicle itself.

Having disclosed my invention, what I claim is as follows:

1. A restraint installed in motor vehicles on an operator's front seat section including a positive, physical connection to come up between the legs of the operator in the motor vehicle to the ignition key in the ignition switch, thereby setting up a restraint that would necessitate the removal of same from the ignition key before the operator could freely leave the motor vehicle and subsequently acting as a reminder and calling attention to the operator to remove the keys from the ignition switch and ensuring their safe removal from the motor vehicle itself, comprising:

a. a ratcheted, button release, spring loaded return, retractable reel unit with an integral hook configuration for placing into openings in one of ignition keys and key rings containing keys in the ignition switch, b. a flat, restraint/safety belt contained in said reel unit, the length of said belt being approximately long enough to run from the back of the operator's front seat section, across the top of a front seat cushion and over to the said one of ignition keys and key rings containing said keys in the ignition switch, c. a stop designed to create a tight, slide fit along said belt, positioned thereon for the desired stop locations for said retractable reel unit, d. a female snap botton and two male prongs contained on a loose end of said belt for fastening purposes to a restraint/safety belt retainer, e. the restraint/safety belt retainer containing two openings for said loose end of said belt to be laced and secured thereon, f. said restraint/safety belt retainer secured on said belt by means of said loose end of said belt being laced through said openings in said belt retainer and being secured back on to itself by means of said female snap button and one of said male prong on the end of said loose end of said belt, g. said restraint/safety belt retainer, secured to said retractable reel unit by said means positioned snug against the back of the operator's seat section, with said belt member passing through and between a movable, up-right back and lower seat sections, lying on and across the operator's seat cushion, with said reel unit positioned on said belt by said stop, to hang freely over the front and slightly below the top of the operator's seat cushion, being between the operator's legs, h. said reel unit, by means of said hook configuration, placed into the opening in said one of the ignition keys and key rings containing said keys in the ignition switch to set up said positive restraint.

2. A new and more useful method of calling attention to operators of motor vehicles to remove their ignition key from the ignition switch and ensuring safe removal from the motor vehicle before departing same by utilizing a positive and physical restraint comprising: a ratcheted, button release, spring loaded return, retractable reel unit with an integral hook configuration for placing into an opening in one of the ignition and key ring containing said key in the ignition switch, a flat restraint/safety belt contained in said reel unit, the length of which to run from the back of the operator's front seat section to the ignition switch, with a stop thereon, designed to create a tight, slide fit along said belt member for desired stop locations for said reel unit, a female snap button and two male prongs affixed to a loose end of said belt, and a restraint/safety belt retainer secured to said belt member by means of two openings therein for lacing the loose end of said belt through and fastening thereon by means of said female snap button and said male prongs on the end of the loose end of said belt; the method comprising the steps of:

making the initial installation of said restraint/safety belt in a motor vehicle on the operator's front seat section by placing the restraint/safety belt retainer snug behind the back of the said seat section, with the restraint/safety belt attached and passing said belt with the retractable unit attached, through and between upper and lower seat sections of a movable back, seat arrangement, laying said belt across and slightly over a front seat cushion, with the retractable reel unit with the integral hook configuration thereon, hanging freely therefrom, in a desired position by means of said stop on said belt, the position approximating being between the legs of the operator; the retractable reel unit with the said hook configuration thereon, being taken from between the operator's legs, pulled forward on said belt and placed into the opening in said one of the ignition key and key ring containing said key in the ignition switch, setting up the required restraint, so that to leave the vehicle the operator must remove the restraint between his/her legs by detachably removing the retractable reel unit with said integral hook from the opening in the one of said ignition key and key ring containing said key in the ignition switch, thereby calling attention to the operator to remove the key from the vehicle, then retracting the reel unit back to its original position on the operator's front seat section, permanently installed thereon.

3. A restraint installed in a motor vehicle in an operator's front seat section, in conjunction with an electrical control circuit to an ignition switch, to ensure the use of said restraint to start the motor vehicle including a positive and physical connection to come up between the legs of the operator of the motor vehicle to one of the ignition key and key ring containing said key in the ignition switch, thereby setting up a restraint that would necessitate the removal of same from the ignition key before the operator could freely leave the motor vehicle and for subsequently calling attention to the operator to remove the key from the ignition switch and the motor vehicle itself, ensuring its safe removal, comprising:

a ratcheted, button release, spring loaded return, retractable reel unit with an integral hook configuration for placing into an opening in one of an ignition key and key ring containing said key in the ignition switch, hanging on the outside of the operator's front seat, from a flat, restraint/safety belt contained in said reel unit, up against the bottom and of a spring loaded flap which swings open, said flap installed in the front section of the operator's seat to approximate being between the operators's legs, said flap having a panel at the top end to act as a stop against the inside portion of said seat section, and a contact for an installed micro-switch/control mechanism, said flat restraint/safety belt contained in said reel unit passing under the bottom end of said spring loaded flap, with a loose end of said belt securely fastened inside and beneath the operator's front seat section, said micro-switch/control mechanism securely fastened inside and beneath said seat section to make contact with said panel in said flap, and connected to an electrical control circuit to the ignition switch to control a sequence of said circuit.

* * * * *